United States Patent
Pham (10) Patent No.: US 10,287,929 B2
(45) Date of Patent: May 14, 2019

(54) VARIABLE VALVE DRIVE HAVING A ROCKER LEVER

(71) Applicant: MAN Truck & Bus AG, München (DE)

(72) Inventor: Hai-Son Pham, Nürnberg (DE)

(73) Assignee: Man Truck & Bus AG, Munich (DE)

(*) Notice: Subject to any disclaimer, the term of this patent is extended or adjusted under 35 U.S.C. 154(b) by 104 days.

(21) Appl. No.: 15/485,572

(22) Filed: Apr. 12, 2017

(65) Prior Publication Data

US 2017/0298786 A1 Oct. 19, 2017

(30) Foreign Application Priority Data

Apr. 13, 2016 (DE) .................... 10 2016 004 531

(51) Int. Cl.
| | |
|---|---|
| F01L 13/00 | (2006.01) |
| F01L 1/18 | (2006.01) |
| F01L 1/047 | (2006.01) |
| F01L 1/08 | (2006.01) |
| F01L 1/20 | (2006.01) |

(Continued)

(52) U.S. Cl.
CPC .............. *F01L 1/181* (2013.01); *F01L 1/047* (2013.01); *F01L 1/08* (2013.01); *F01L 1/20* (2013.01); *F01L 1/462* (2013.01); *F01L 13/0063* (2013.01); *F16H 37/122* (2013.01); F01L 1/2411 (2013.01); F01L 1/267 (2013.01); F01L 13/0026 (2013.01); F01L 13/0047 (2013.01); F01L 2105/00 (2013.01); F01L 2820/032 (2013.01)

(58) Field of Classification Search
CPC ..... F01L 1/08; F01L 1/181; F01L 1/46; F01L 13/0026; F01L 13/0047; F01L 13/0063; F01L 2105/00; F01L 2820/032
USPC .............................................. 123/90.16, 90.2
See application file for complete search history.

(56) References Cited

U.S. PATENT DOCUMENTS

| 4,572,118 A | 2/1986 | Baguena et al. |
| 6,085,707 A * | 7/2000 | Nemoto .................. F01L 1/267 |
| | | 123/90.15 |

(Continued)

FOREIGN PATENT DOCUMENTS

| DE | 4230877 A1 | 4/1993 |
| DE | 19519048 A1 | 11/1996 |

(Continued)

OTHER PUBLICATIONS

Extended European Search Report issued in corresponding EP application No. 17161337.5 dated Oct. 12, 2017.

(Continued)

*Primary Examiner* — Jorge L Leon, Jr.
(74) *Attorney, Agent, or Firm* — Weber Rosselli & Cannon LLP (57) ABSTRACT

The present disclosure relates to a variable valve drive for a lifting valve, in particular for a charge-exchange valve of an internal combustion engine, which is periodically movable between a closed position and an open position indirectly by way of a cam via a rocker lever. The variable valve drive includes a switchable rocker lever arrangement for the actuation of the lifting valve, having a transmission rocker lever and a valve rocker lever which are mounted pivotably on different rocker lever axles which are each parallel to the camshaft axis.

12 Claims, 6 Drawing Sheets

(51) Int. Cl.
F01L 1/46 (2006.01)
F16H 37/12 (2006.01)
*F01L 1/24* (2006.01)
*F01L 1/26* (2006.01)

(56) References Cited

U.S. PATENT DOCUMENTS

| | | | | |
|---|---|---|---|---|
| 2001/0035141 A1* | 11/2001 | Pierik | ................ | F01L 13/0063 123/90.16 |
| 2004/0118369 A1* | 6/2004 | Naumann | ........... | F01L 13/0063 123/90.16 |
| 2014/0000538 A1* | 1/2014 | Breuer | ................ | F01L 13/0015 123/90.31 |

FOREIGN PATENT DOCUMENTS

| | | |
|---|---|---|
| DE | 19520117 C2 | 4/2002 |
| DE | 102004040652 A1 | 2/2006 |
| DE | 102005019991 A1 | 11/2006 |
| DE | 102007022266 A1 | 11/2008 |
| DE | 102011014744 A1 | 9/2012 |
| EP | 0826866 A2 | 3/1998 |
| JP | H11-336599 A | 12/1999 |
| JP | 2004-27895 A | 1/2004 |
| JP | 2011-231742 A | 11/2011 |
| JP | 2011231742 A * | 11/2011 ............. F01L 1/352 |
| JP | 2014-234795 A | 12/2014 |
| WO | 98/03778 A1 | 1/1998 |
| WO | 2006/092312 A1 | 9/2006 |

OTHER PUBLICATIONS

German Search Report issued in corresponding application No. 102016004531.0 dated Nov. 30, 2016.
Schnitzlein, G. et al., Kraftfahrzeugtechnik. 3., stark bearbeitete Auflage. Berlin: VEB Verlag Technik, 1976. S. 121 und 122. Stichwort: "Ventilsteuerung".—ISBN keine.

* cited by examiner

VARIABLE VALVE DRIVE HAVING A ROCKER LEVER

BACKGROUND

1. Technical Field

The present disclosure relates to a variable valve drive for a lifting valve, in particular for a charge exchange valve of an internal combustion engine, which is periodically movable between a closed position and an open position indirectly by a cam via a rocker lever.

2. Description of Related Art

It is known for gas exchange valves of an internal combustion engine to be operated in a variable manner with different opening and closing times and with different valve opening lifts. Such variable valve drives offer the advantageous possibility of targeted adaptation of the profile of the valve lift curve over the cam angle as a function of operating parameters of the device that is equipped with the respective lifting valve, that is to say for example as a function of rotational speed, load or temperature of an internal combustion engine.

In particular, it is known for multiple different lift curves for a lift valve to be generated by virtue of multiple cams being provided for the actuation of said lifting valve, and by virtue of the fact that, in each case, the contour of only one cam acts on the lifting profile. For the switch to another lifting profile, a switch is made to the contour of another cam. Such valve control is already known from DE 42 30 877 A1. Here, a camshaft block with two different cam contours is arranged rotationally conjointly but axially displaceably on a camshaft. In accordance with the axial position of the cam block, a cam contour is operatively connected to the lifting valve via an intermediate element (transmission lever). The axial displacement of the cam block for the purposes of varying the valve parameters is performed, during the base circle phase, by way of a thrust ring counter to the action of a restoring spring.

DE 195 19 048 A1 has already disclosed a variable valve drive for an internal combustion engine, in which it is likewise the case that two cams which are of different design in terms of their cam contour are arranged directly adjacent to one another on the camshaft. The change of the cam engagement is realized by way of an axial displacement of the camshaft with the cams situated thereon.

Furthermore, DE 195 20 117 C2 has already disclosed a valve drive of an internal combustion engine, in the case of which an axially displaceable cam block with at least two different cam tracks is arranged rotationally conjointly on the camshaft. The adjustment of the cam block is realized by way of an adjustment member which is guided in the interior of the camshaft. By way of a double-acting hydraulic or pneumatic piston-cylinder unit arranged at the face side on the camshaft, the adjustment member is displaced in the interior of the camshaft. The adjustment member is connected to a driver piece which extends through an elongated hole arranged in the camshaft and which issues into a bore of the cam block.

A disadvantage of the cited prior art is that different opening and closing times and different valve opening lifts cannot be set in continuously variable fashion. Likewise, an adjustment by way of axial cam displacement is always possible only when the valves are in the closed state, such that the adjustment must be performed across the cylinders independently of one another. A further disadvantage is that, with said known approaches, it is not possible for an existing valve drive without variability to be converted to a valve drive with variability without the need for changes to be made to peripheral components aside from those directly required for realizing the variability.

SUMMARY

It is an object of the present disclosure to provide an improved variable valve drive having a rocker lever, by way of which disadvantages of conventional techniques can be avoided. It is another object of the present disclosure to provide a variable valve drive which permits a continuous variation, which takes place independently of the present valve position, of the valve opening and closing times and of the valve opening lifts.

These objects are achieved by way of a variable valve drive. Advantageous embodiments and uses of the present disclosure are defined in the claims and will be discussed in more detail in the following description, in part with reference to the figures.

According to the present disclosure, a variable valve drive for a lifting valve is provided. The lifting valve is periodically movable between a closed position and an open position, in particular counter to the force of a restoring spring, indirectly by way of a cam of a camshaft. The lifting valve is a charge exchange valve of an internal combustion engine.

According to general aspects of the present disclosure, the valve drive includes a switchable rocker lever arrangement for the actuation of the lifting valve. A switchable rocker lever arrangement is to be understood to mean a rocker lever arrangement which, by way of a switching device, referred to in the present document as an actuating device, can be varied in terms of its transmission characteristics, with regard to the transmission of the cam movement to the lifting valve, in such a way that a valve opening and/or closing time and/or a magnitude of the valve opening lift can be varied.

The rocker lever arrangement includes a first rocker lever, hereinafter referred to as transmission rocker lever, and a second rocker lever, hereinafter referred to as valve rocker lever, which are mounted pivotably on different rocker lever axles which are each parallel to the camshaft axis. Here, the valve rocker lever, at a first end, is in operative contact with the lifting valve, and at a second end, has a roller, in particular a thrust roller. The transmission rocker lever is assigned, at a first end, to a cam of the camshaft, that is to say engages with the cam in order to pick off the cam movement. The transmission lever performs a rocking movement in accordance with the cam movement. At a second end, the transmission rocker lever is operatively connected by way of a contour surface, in particular a valve-lift-defining contour surface, to the roller of the valve rocker lever, in such a way that a rocking movement of the transmission rocker lever generates a corresponding rocking movement of the valve rocker lever, in the case of which the roller of the valve rocker lever rolls on the contour surface. As a result of the rocking movement of the transmission lever, the roller of the rocker lever thus rolls on the contour surface, and the resulting rocking movement of the valve rocker lever gives rise to a corresponding valve lift. In this context, the transmission lever and valve lever are connected in series, it also being possible for the rocking movement thereof to be orientated oppositely, depending on the embodiment.

The contour surface is a surface of the transmission rocker lever on which the roller of the valve rocker lever rolls back and forth during the transmission of the cam movement to the lifting valve and thus transmits or couples the movement of the transmission rocker lever to the valve rocker lever. The profile of the valve lift can be defined by way of the design of the surface shape of the contour surface, for example of the gradient in a rolling direction. In the present disclosure, instead of the term contour surface, the term rolling contour is also used.

The variable valve drive includes an actuating device for the switching of the rocker lever arrangement, by way of which actuating device the contour surface can, by means of a planetary gearing, e.g. a planetary gear set, be rotated about the rocker lever axle of the transmission rocker lever with a certain transmission ratio in order to generate a displacement of a rolling region of the roller of the valve rocker lever on the contour surface. The actuating device may be designed to generate a rotation of the contour surface, or of that part of the transmission rocker lever which includes the contour surface, relative to the valve rocker lever. In this way, that region of the contour surface which is picked off by the roller of the valve rocker lever, and thus also the resulting valve lift and/or the valve opening and/or closing times, are varied. The planetary gearing is not part of the actuating device, but rather the actuating device acts on a planetary gearing, which in turn effects the rotation of the contour surface. By means of the actuating device, it is thus possible in particular for a rolling region of the roller of the valve rocker lever on the contour surface to be varied. Likewise, the planetary gearing makes it possible to realize, between the rocking movement of the transmission rocker lever and that of the valve rocker lever, a transmission ratio which is expedient for the usage situation.

Here, the kinematic arrangement described for the two actions of valve lift and lift adjustment is superposed. Through corresponding design of the contour surface, it is furthermore possible for the valve to be held completely closed, or else to be briefly held open with the maximum valve lift if corresponding rolling regions of the contour surface are formed without a gradient. A particular advantage also lies in the fact that the lift adjustment can be performed at any point in time, that is to say an adjustment can also be performed while the valves are open. It is thus possible for switching to be made possible which is independent of the present valve position and camshaft rotation.

In the case of this valve drive, the valve lift is thus not predefined directly by the cam elevation. The cam contour serves merely for the rocking movement of an auxiliary lever which, in the present case, is referred to as transmission rocker lever. An advantage of the variable valve drive according to the present disclosure is that the construction of the rocker lever and camshaft can remain unchanged—in relation to a conventional, non-variable valve drive. A further advantage is that the variable valve drive performs the valve actuation with few moving masses, because the valve rocker lever rocks upward and downward in the conventional manner, the transmission rocker lever likewise rocks upward and downward, and the camshaft rotates in the conventional manner. For this purpose, it is possible for masses to be further reduced by means of the generated transmission ratios of the planetary gear set. Furthermore, the variable valve drive makes it possible to realize a highly robust solution for fully variable control, in particular for the sector of utility vehicle engines and industrial engines. The camshaft bearings are relieved of load because the forces are accommodated by the continuously extending shaft of the transmission rocker lever. In an embodiment, the transmission rocker lever may have a planet carrier element and at least one planet gear of the planetary gearing. For example, three planet gears may be provided. The at least one planet gear is guided by the planet carrier element. The planet carrier element furthermore has a first end, which engages with a cam of the camshaft. The planet carrier element may for example engage with the cam of the camshaft via a roller.

In this embodiment, the transmission rocker lever furthermore has an internal gear of the planetary gearing. The internal gear engages into the at least one planet gear and has, on the outer circumference, the contour surface which predefines the lift. The at least one planet gear is arranged in the interior of the internal gear and may mesh with internal teeth of the internal gear. The planetary gearing may furthermore have a sun gear which is connected rotationally conjointly to a shaft which can be rotated by the actuating device. Said shaft will hereinafter also be referred to as sun gear shaft.

The transmission rocker lever may thus comprise two assemblies, the planet carrier element and the internal gear, which on its outer circumference has the contour surface (rolling contour). The cam contour is picked off by the planet carrier, the angular magnitude of the rocking movement of which remains constant, independently of the set valve lift, throughout operation. The rocking of the planet carrier element and the resulting rotation of the planet gears give rise to the rotation of the internal gear with a corresponding transmission ratio. A corresponding configuration of said transmission ratio can lead to a large valve lift in the case of a small cam elevation. It is thus possible for rotating masses on the camshaft to be reduced.

The transmission rocker lever may in turn have a first lever, referred to here as the planet carrier element, which engages with the cam of the camshaft, and a second lever, having the internal gear with the contour surface which is operatively connected to the roller of the valve rocker lever. By means of the internal gear of the second lever and the planet gears of the first lever (planet carrier element), said first lever and the second lever of the transmission rocker lever are coupled to one another in terms of motion, in particular such that a rocking movement of the first lever generated by the cam leads to a rocking movement of the second lever about the rocker lever axis of the transmission rocker lever in accordance with the transmission ratio of the planetary gearing.

Furthermore, by way of the actuating device, a rotational position of the second lever relative to the first lever can be varied in order to vary a rolling region of the roller of the valve rocker lever on the contour surface. In the rotational position that can be set by way of the actuating device, the first lever and the second lever are then coupled to one another in terms of movement again such that, when caused to do so by the cam, they are pivoted back and forth jointly about the rocker lever axle. In this way, it is possible for a robust adjustable transmission mechanism for the variable transmission of the cam movement to the valve rocker lever to be provided.

The sun gear is situated on an axle which extends continuously across all cylinders. The continuously extending axle is rotatably mounted. Planet carrier and internal gears may be movable separately and independently of one another for each cylinder. To adjust the valve lift, a rotational position of the sun gear is varied by means of the actuating device. For this purpose, the shaft bearing the sun gears may be rotatable by the actuating device.

The actuating device may include an electrical, electromechanical, mechanical or hydraulic actuating unit, by means of which, for the adjustment of the valve lift, a rotational position of the shaft bearing the sun gear can be adjusted. As a result of the rotation of the sun gear and the transmission of said movement to the planet gears, the internal gear rotates in accordance with the configured transmission ratio. This may, by contrast to the situation with the valve lift, be a step-down transmission ratio. The actuating device may for example comprise an electric motor or be designed as an electric motor.

In a further embodiment, the contour surface has a first rolling region which generates no valve lift when the roller of the valve rocker lever rolls on the first rolling region. The first rolling region forms in particular a base circle contour, and will hereinafter also be referred to as base circle region. The rolling points on the base circle region may have a constant radial spacing to the axis of the rocker lever axle of the transmission lever.

In this further embodiment, the contour surface furthermore has a second rolling region which adjoins the first rolling region and which has a ramp contour. A ramp contour defines a valve lift in such a way that the valve lift becomes greater the further the roller of the valve rocker lever rolls on the second rolling region proceeding from the first rolling region. A ramp contour is thus to be understood to mean a region which, in a direction of movement of the roller, has an increasing radial spacing to the axis of the rocker lever axle of the transmission lever. In the opposite movement direction of the roller, the radial spacing to the second rolling region consequently decreases. A rolling region is to be understood to mean a region of the contour surface on which the roller of the valve rocker lever can roll during a rocking movement of the transmission rocker lever. The extent to which the roller actually rolls on a particular rolling region during a rocking movement is dependent on the rotational position, set by the actuating device, of the contour surface.

In an advantageous variant, the contour surface has a third rolling region which adjoins the second rolling region. The third rolling region may generate a valve position with a predetermined constant valve lift, for example a valve position with maximum valve lift, when the roller of the valve rocker lever rolls on the third rolling region. The rolling points on the third rolling region probably have a constant radial spacing to the axis of the rocker lever axle of the transmission lever. The radial spacing of the third rolling region is however greater than that of the first rolling region.

The region of the contour surface rolled on by the rocker lever roller always remains constant in terms of angular magnitude. As a result of the rotation of the contour surface relative to the valve rocker lever by way of the actuating device, however, that region of the contour surface which is actually picked off, that is to say rolled on, by the roller can be displaced. For example, if the contour surface is rotated relative to the valve rocker lever by way of the actuating device such that the rocker lever rolls over a shorter distance on the first region and, instead, over a greater distance on the second region, the valve lift is increased. The valve lift and/or the valve opening and closing times that result from the rolling of the valve rocker lever on the contour surface can be set by way of expedient configuration of the dimensions and/or gradients and/or gradient profiles of the rolling regions. Depending on the setting or variation of the rolling region, the lifting valve can for example be held fully closed, for example if the roller of the valve rocker lever rolls back and forth exclusively on the first rolling region. Furthermore, it is possible to realize valve operation in which the lifting valve is briefly held open at maximum valve lift. This may be achieved for example if the contour surface is, by way of the actuating device, fixed in a rotational position in which the rolling movement of the roller of the valve rocker lever also at least partially encompasses the third region. During the rolling movement on the third region, the lifting valve is briefly held open at maximum valve lift.

In a further advantageous variant of this embodiment, the contour surface has a fourth rolling region, which adjoins the third rolling region and which in turn forms a ramp contour, and a fifth region, which adjoins the fourth rolling region. The rolling points on the fifth rolling region have a constant radial spacing to the axis of the rocker lever axle of the transmission lever. The radial spacing of the rolling region is greater than the radial spacing of the third rolling region and greater than the radial spacing of the first rolling region. In this design variant with five rolling regions, the third region forms a middle position, in which, briefly, that is to say when the roller rolls on the third region, the lifting valve is held open in an open position with a constant lift magnitude which is smaller than the maximum lift magnitude.

It is particularly advantageous if the actuating device is designed to vary a rotational position of the shaft bearing the sun gear in continuous fashion. Alternatively, the actuating device may be designed to vary a rotational position of the shaft bearing the sun gear into two predetermined positions, such that switching is possible between two different valve lifts.

In a further embodiment, the transmission rocker lever may be preloaded by way of a restoring spring such that the transmission lever is pushed against the camshaft. This makes it possible for the cam movement to be picked off in a reliable manner. For example, the planet carrier element of the transmission rocker lever may be preloaded by way of a restoring spring such that the transmission rocker lever is pushed against the camshaft.

In the context of the present disclosure, it is also possible for the valve rocker lever, at its valve-side end, to have a receptacle in which there is received a hydraulic valve-clearance compensating element or a screw with an elephant-foot configuration.

The valve rocker lever may furthermore, on its underside, that is to say on its side facing toward the cylinder head, have a geometry for axial fixing to a bearing block. For example, the rocker lever may have a bearing arrangement for fastening to a rocker lever bearing block on which the rocker lever axle is arranged, onto which rocker lever axle the rocker lever is, by way of an associated bore, pivotably mounted and held by way of an axial position-securing means, wherein the axial position-securing means is a guidance-imparting connection, as an engagement element-counterpart element connection, between the bearing block and the rocker lever, in the case of which an engagement element oriented transversely with respect to the axial direction, for example in the form of a ring-shaped web, engages pivotably into an associated counterpart element with axial flank support.

According to a further aspect of the present disclosure, an arrangement is provided including at least two variable valve drives according to the present disclosure, as described above by way of example, wherein the transmission rocker levers each have a common first rocker lever axis, the valve rocker levers each have a common second rocker lever axis, and the at least two variable valve drives have a common actuating device in the form of an electric motor. The electric motor is operatively connected to a shaft, the sun gear shaft, which is coaxial with respect to the first rocker lever axis and on which the sun gear of each of the valve drives is arranged in each case. Here, it is thus the case that only one actuator/ actuating motor in the form of an electric motor is required to actuate the adjustment across all cylinders. Likewise, the lift adjustment is performed simultaneously for all cylinders, because the sun gear that is rotated for this purpose is seated on a continuously extending shaft.

A further aspect of the present disclosure relates to a motor vehicle, in particular a utility vehicle, having a variable valve drive as described in this document.

BRIEF DESCRIPTION OF THE DRAWINGS

The above-described embodiments and features of the present disclosure may be combined with one another as desired. Further details and advantages of the present disclosure will be described below with reference to the appended drawings, in which.

Identical parts are denoted by the same reference designations in the figures, such that the various views of the valve drive shown in the figures can be understood from this also.

DETAILED DESCRIPTION

Figure 1:
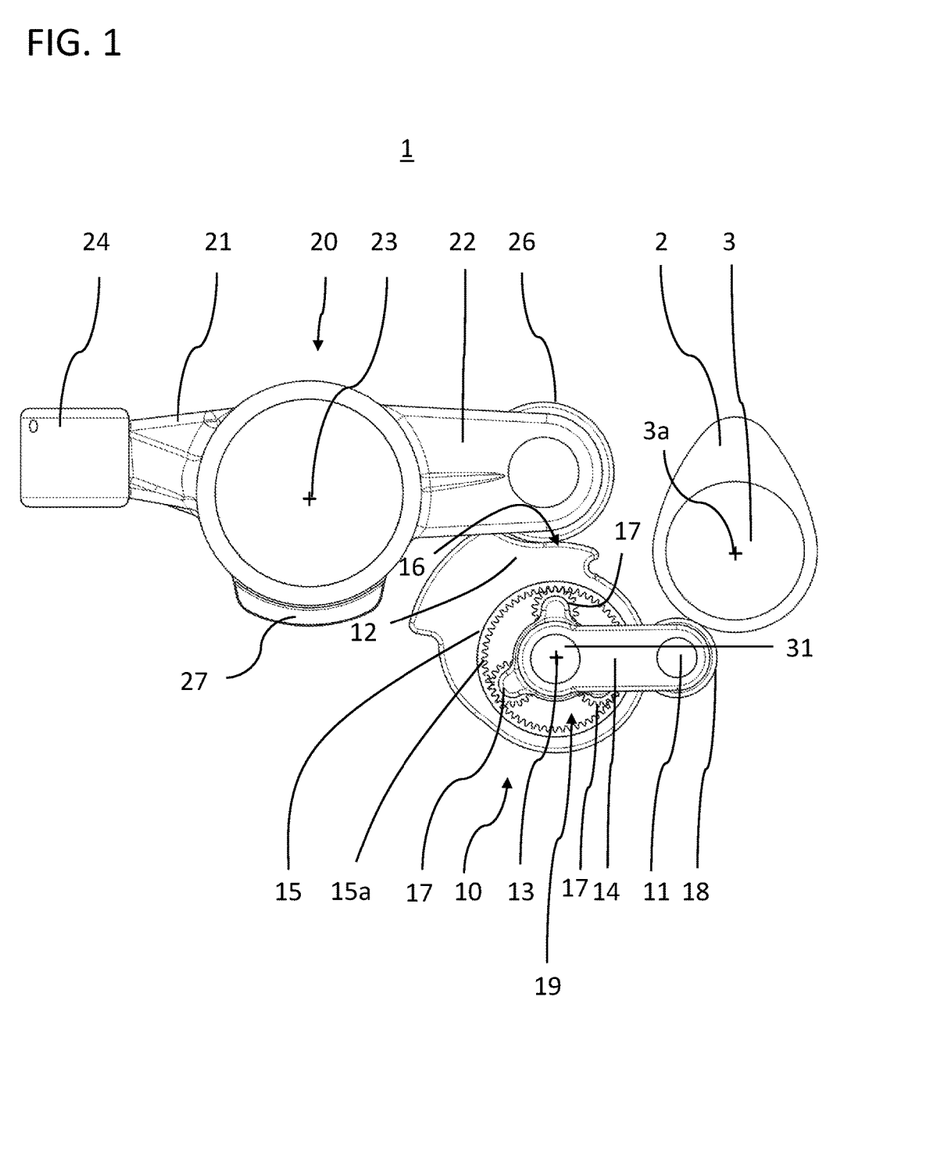
FIG. 1 shows a side view of a valve drive according to an embodiment of the present disclosure.
Figure 3:
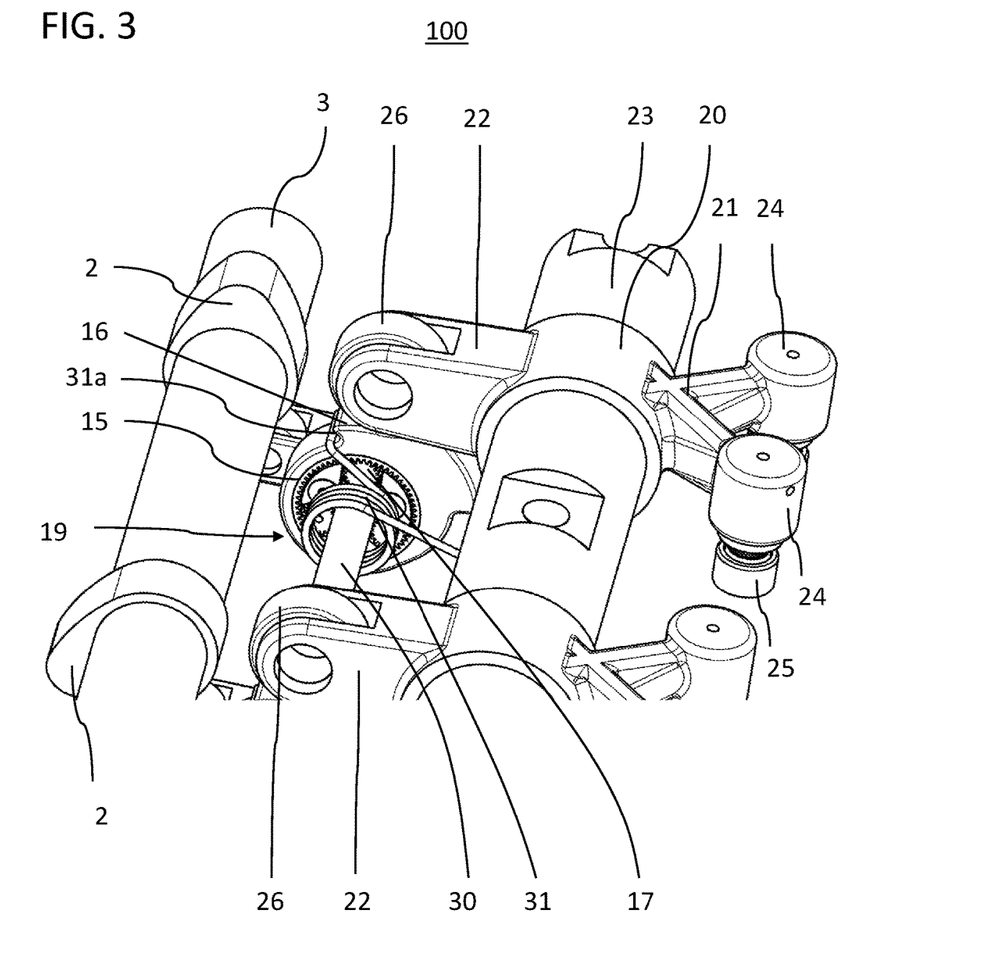
FIG. 3 shows a perspective illustration of a valve drive according to an embodiment of the present disclosure.

FIG. 1 shows a side view of a variable valve drive 1 according to an embodiment of the present disclosure. FIG. 3 shows a corresponding perspective view. The valve drive 1 serves for the actuation of charge exchange valves (not shown) of an internal combustion engine, which charge exchange valves are periodically movable between a closed position and an open position indirectly by way of a cam 2 of a camshaft 3.

The valve drive 1 includes a switchable rocker lever arrangement for the actuation of the lifting valves. The rocker lever arrangement includes a first rocker lever (valve rocker lever) 20, which is mounted so as to be pivotable about a rocker lever axle 23, and a second rocker lever (transmission rocker lever) 10, which is mounted so as to be pivotable about a further rocker lever axle 13. The two rocker lever axles 13, 23 are spatially separate but are both parallel to the axis 3a of the camshaft 3.

The valve rocker lever 20 is, at a valve-side end 21, that is to say by way of its valve-side lever arm 21, in operative contact with two lifting valves (not shown). The valve-side lever arm 21 of the valve rocker lever 20 is, for this purpose, designed as a two-valve lever arm for the purposes of actuating two charge exchange valves simultaneously. For this purpose, the valve-side lever arm 21 is of forked form, as can be seen in FIG. 3. As can also be seen in FIG. 3, two such valve rocker lever arrangements are arranged one behind the other in an axial direction of the camshaft for the purposes of actuating four lifting valves. This arrangement of the two valve drives is denoted in its entirety by the reference 100.

A receptacle 24 is arranged at each valve-side end of the lever arm 21. The receptacle 24 may be used for the mounting of a hydraulic valve-clearance compensating element 25 such as is known per se. Instead of a hydraulic valve-clearance compensating element, it is also possible, with corresponding machining, for there to be received in the receptacle 24 a screw with an elephant-foot configuration, by way of which a valve clearance can be manually readjusted.

Hydraulic valve-clearance compensating elements in internal combustion engines are known per se and serve for compensating in particular the changes in length dimensions of the charge exchange valves over the service life, in such a way that reliable valve closure is ensured in the base circle phase of the cam that actuates the valve. Here, it is on the other hand sought for the cam lift to be transmitted to the valve, and thus converted into a valve lifting movement, without losses. The mode of operation of such hydraulic valve-clearance compensating elements which are arranged in the force flow of a valve controller, in particular of an internal combustion engine, is assumed to be known.

The valve rocker lever 20 is held on a rocker lever bearing block (not shown), wherein the rocker lever axle 23 is arranged on the rocker lever bearing block, onto which rocker lever axle the valve rocker lever 20 is, by way of an associated bore, pivotably mounted and held by way of an axial position-securing means. In the present exemplary embodiment, the axial position-securing means is designed as an engagement element-counterpart element connection between the bearing block and the rocker lever, in the case of which an engagement element oriented transversely with respect to the axial direction, for example in the form of a ring-shaped web 27, engages pivotably into an associated counterpart element (not illustrated) with axial flank support. The axial position-securing means may however also be realized, in a manner known per se, by way of abutment surfaces on the rocker lever flanks. Said flanks may be created for example by calibration of the forged blank or by mechanical machining. At the bearing block side, the fixing may likewise be realized by way of correspondingly machined surfaces and by way of discs and securing rings. Furthermore, axial position-securing means between a rocker lever and the axle are known. For example, for this purpose, a region of the axle which is surrounded by the bore of the rocker lever has a ring-shaped groove in which there runs a circlip, which simultaneously runs by way of its outer ring-shaped section in a ring-shaped groove of the rocker lever.

At its opposite end 22 in relation to the rocker axle 23, that is to say at the camshaft-side lever arm 22, a roller 26 is arranged on the distal end of the lever arm 22.

The transmission rocker lever 10 is in engagement, at a camshaft-side end 11, with the cam 2 of the camshaft 3. For this purpose, a roller 18, for example a thrust roller, is arranged on the camshaft-side end 11, which roller rolls on the cam 2 of the camshaft 3 and thus picks off the cam movement. The transmission rocker lever 10 is furthermore, at the other end 12 in relation to the rocker lever axle 13, operatively connected by way of a lift-defining surface, referred to as contour surface 16, to the roller 26 of the valve rocker lever 20, that is to say the roller 26 of the valve rocker lever 20 rolls on the contour surface 16 during a rocking movement of the transmission rocker lever 10 generated by the cam movement, whereby a corresponding rocking movement of the valve rocker lever 20 is generated. The transmission rocker lever 10, by way of its rocking movement, transmits the cam movement to the valve rocker lever 20, which in turn, by way of its correspondingly resulting rocking movement, generates the valve lift. In this way, the transmission rocker lever 10 and valve rocker lever 20 are connected in series. The camshaft 3 and valve rocker lever 20 may, for this purpose, be designed in a manner known per se, and are coupled to one another in terms of movement by way of the transmission lever 10 arranged in between.

The contour surface 16 on which the valve rocker lever roller 26 is supported serves as a rolling region on which the valve rocker lever roller 26 rolls back and forth during the transmission of the rocking movement of the transmission rocker lever 10 to the valve rocker lever 20. The lift characteristic of the lifting valve can thus be predefined, and also varied, by way of the design of said contour surface 16 which serves as rolling surface.

As can be seen in FIG. 1, the cam movement is transmitted via a planetary gearing 19. Here, the transmission rocker lever 10 has a planet carrier element 14 which, at its camshaft-side end 11, has the mounted roller 18. At its opposite end, the planet carrier element 14 guides three planet gears 17, which are arranged in an internal gear 15 which is pressed into the planet carrier element and which mesh with the internal teeth 15a thereof. The planet gears 17 furthermore mesh with a sun gear (not visible) which is arranged on the shaft 13 and which is thus positioned at the central point of the planet carrier arrangement.

The cam contour is thus picked off by the planet carrier element 14, whose angular magnitude of the tilting movement remains constant independently of a set valve lift throughout operation. The tilting of the planet carrier element 14 and the resulting rotation of the planet gears 17 result in the rotation of the internal gear 15 with a corresponding transmission ratio. The internal gear 15 is part of a component, also referred to in this case as second lever of the transmission rocker lever, which forms the lift-predefining contour surface 16 on which the rocker lever roller 26 of the rocker lever 20 rolls. As a result of the tilting of the planet carrier element 14, the internal gear 15 with the contour surface 16 rotates with a corresponding transmission ratio. Here, the rocker lever roller 26 rolls on the contour surface 16 and accordingly opens the valves.

The sun gear is arranged rotationally conjointly on a continuously extending shaft 30 which is designed to extend continuously across all cylinders and which thus has a respective sun gear for each cylinder. The continuously extending shaft is connected to an electric motor (not shown) as electric motor, which with corresponding actuation can rotate the continuously extending shaft 30 in targeted fashion for the purposes of adjusting the valve lift and/or the valve opening times and valve closing times.

An advantage of the present disclosure thus lies in the simultaneous control of the variability of the valve lift across all cylinders by means of only one actuating motor, which performs only a rotational movement with a small rotational angle magnitude.

The lever 10 is preloaded by way of a restoring spring 31 via a restoring spring abutment point 31a, such that the entire transmission rocker lever 10 is forced against the camshaft 3 by the spring force of the restoring spring.

Figure 2:
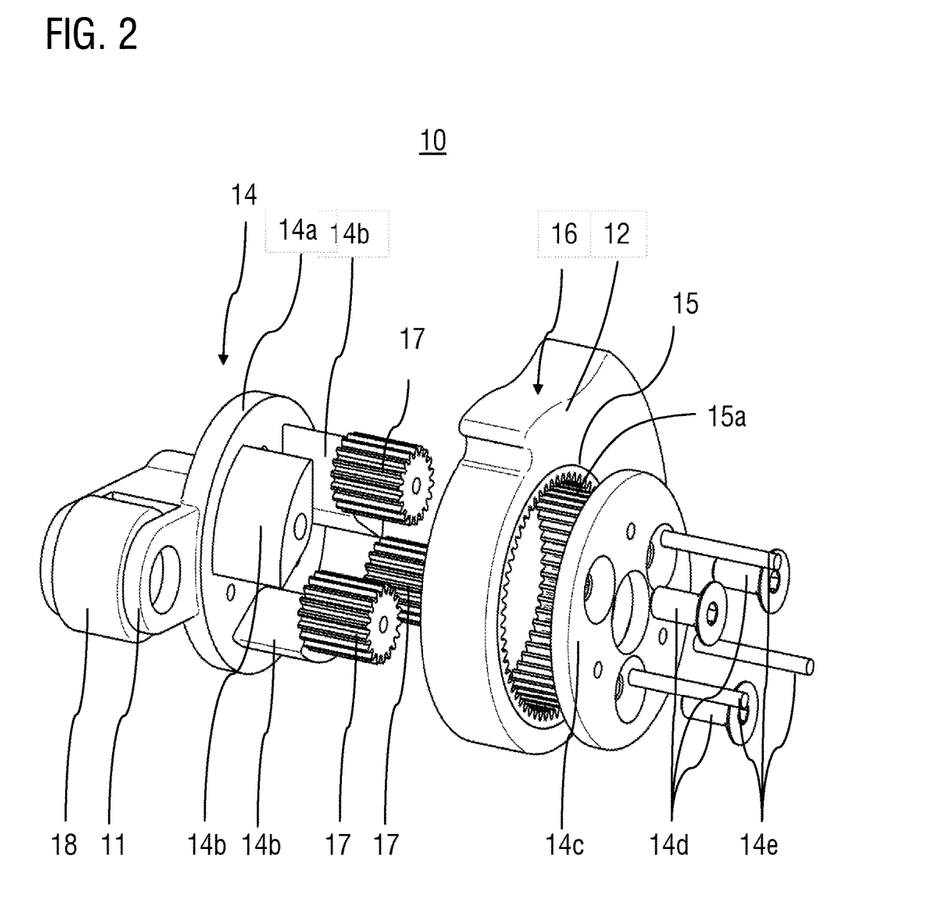
FIG. 2 shows a perspective exploded illustration of a transmission rocker lever according to an embodiment of the present disclosure.

The above-described construction of the transmission rocker lever 10 can be clearly seen in the perspective exploded illustration of FIG. 2. The planet carrier element 14 guides planet gears 17 which are guided in each case by means of a pin between a receiving element 14a and a cover 14c of the planet carrier element 14, wherein the cover 14c is fastened by way of three countersunk screws 14d to the three support elements 14b.

Figure 4:
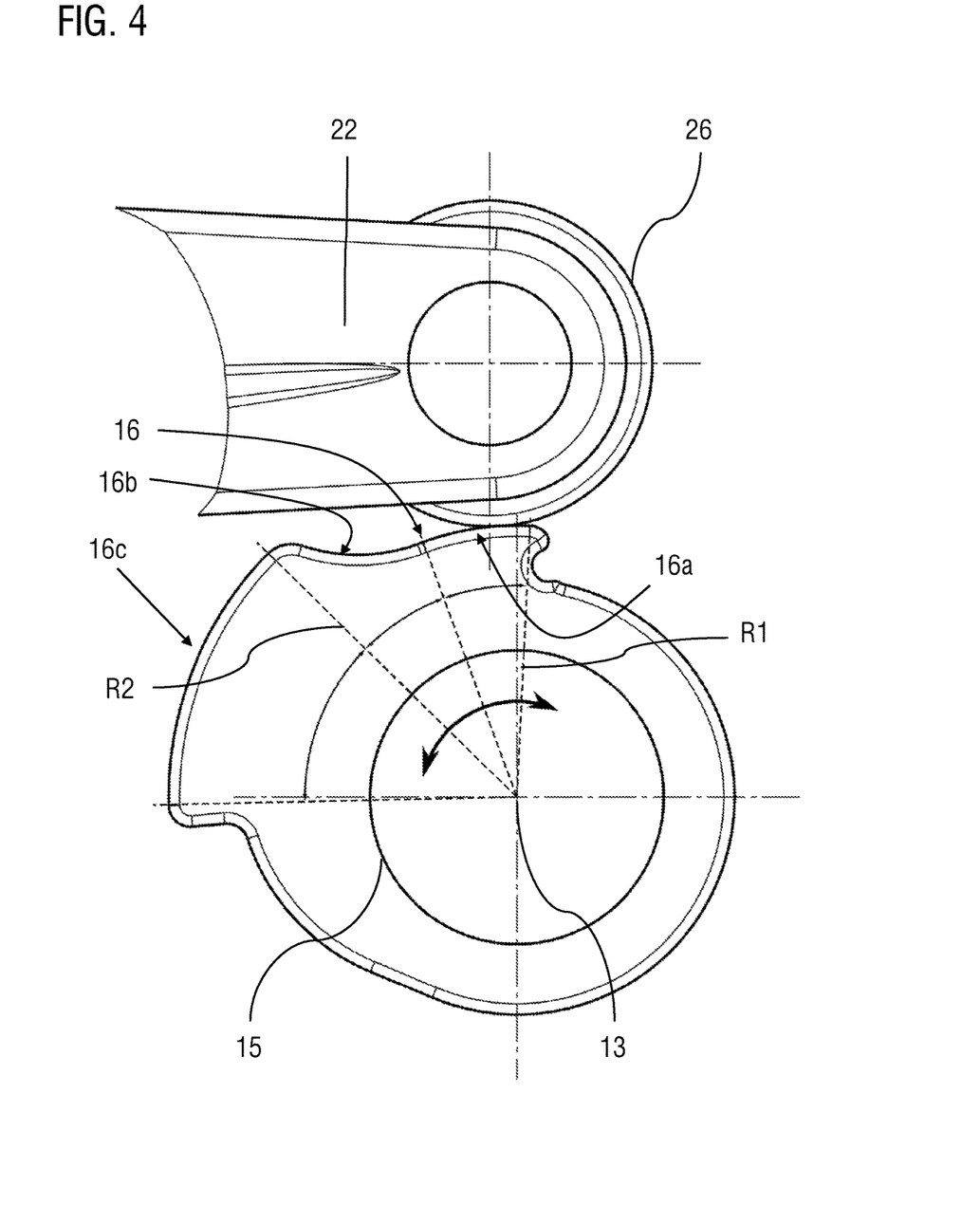
FIG. 4 shows a detail view of the coupling between valve rocker lever and transmission rocker lever according to an embodiment of the present disclosure.

FIG. 4 shows a detail view of the coupling between valve rocker lever 20 and the transmission rocker lever 10 at the contour surface 16. In this exemplary embodiment, the contour surface 16 has three different regions 16a, 16b and 16c, which can serve as rolling regions for the roller 26.

The first rolling region 16a forms the base circle contour, that is to say the valve rocker lever 20 generates no valve lift when the roller 26 rolls on said region. The spacing of the points on the first rolling surface 16a to the axis of the rocker lever axle 13, that is to say the radial spacing R1 thereof, is constant. The contour surface 16 furthermore includes a second rolling region 16b which directly adjoins the first rolling region 16a and which has a ramp contour. On the second rolling region, the radial spacing of the rolling points increases from a value R1 to a value R2. Thus, if the roller 26 rolls on the second region 16b proceeding from the first region 16a, the valve rocker lever 20 rocks more the further the roller 26 rolls on the second rolling region 16b. Consequently, the valve lift that is generated is greater the further the roller 26 of the valve rocker lever 20 rolls on the second rolling region 16b proceeding from the first rolling region 16a.

The second rolling region 16b is adjoined by a third rolling region 16c, which has a constant radial spacing R2 and which generates a valve position with maximum valve lift if the roller 26 of the valve rocker lever 20 rolls on the third rolling region 16c.

As already described above, the valve drive 1 includes an electric motor as an actuating device for varying the rotational position of the sun gear shaft 30. Through variation of the rational position of the sun gear shaft 30, the contour surface 16 is likewise rotated about the rocker lever axle 13 of the transmission rocker lever 10 in order to generate a displacement of a rolling region of the roller 26 of the valve rocker lever 20 on the contour surface 16. In this way, that region of the contour surface 16 which is rolled on, that is to say picked off, by the roller of the valve rocker lever is varied, along with the resulting valve lift and/or the valve opening and/or closing times.

By means of the targeted variation of the rotational position of the sun gear shaft 30, it is thus possible for the rotational position of that component of the transmission rocker lever which includes the internal gear 15 relative to the planet carrier element 14 to be varied in order to vary a rolling region of the roller 26 of the valve rocker lever 20 on the contour surface 16. In each of the different settable rotational positions, planet carrier element and internal gear 15 are then again coupled in terms of movement with regard to a pivoting movement (rocking movement) about the rocker lever axle 13.

For example, the actuating device may be designed to set two different rotational positions of the internal gear 15 or of the contour surface 16 relative to the planet carrier element 14, resulting in two different rolling regions for the roller 26 of the valve rocker lever 10. For this usage situation, it would also be possible to utilize a conventional hydraulic camshaft adjuster instead of an electric motor.

In a first set rotational position, during a rocking movement of the transmission rocker lever 10 generated by the cam 2, it is possible, purely by way of example, for the roller 26 to roll back and forth on a first rolling region, which encompasses almost the entire first rolling region 16a and a first subregion of the second rolling region 16b. By contrast, in a second set rotational position, during a rocking movement of the transmission rocker lever 10 or of the internal gear 15 generated by the cam 2, it is possible for the roller 26 to roll back and forth on the second rolling region, which encompasses almost the entire second rolling region 16b and a subregion of the third rolling region 16c.

If the valve drive 1 is switched from the first rolling region to the second rolling region, the valve lift that can be generated by the camshaft 3 is increased.

The actuating device may be designed such that it can set a rotational position of the second lever relative to the first lever into two predetermined positions, such that switching is possible between two different, predetermined rolling regions on the contour surface 16, and thus valve lifts. Alternatively, the actuating device may also be designed such that more than two predetermined rotational positions can be set, or the rotational position is continuously variable within predefined limits. In the latter variant, the valve lift can be varied in continuous fashion.

Figure 5:
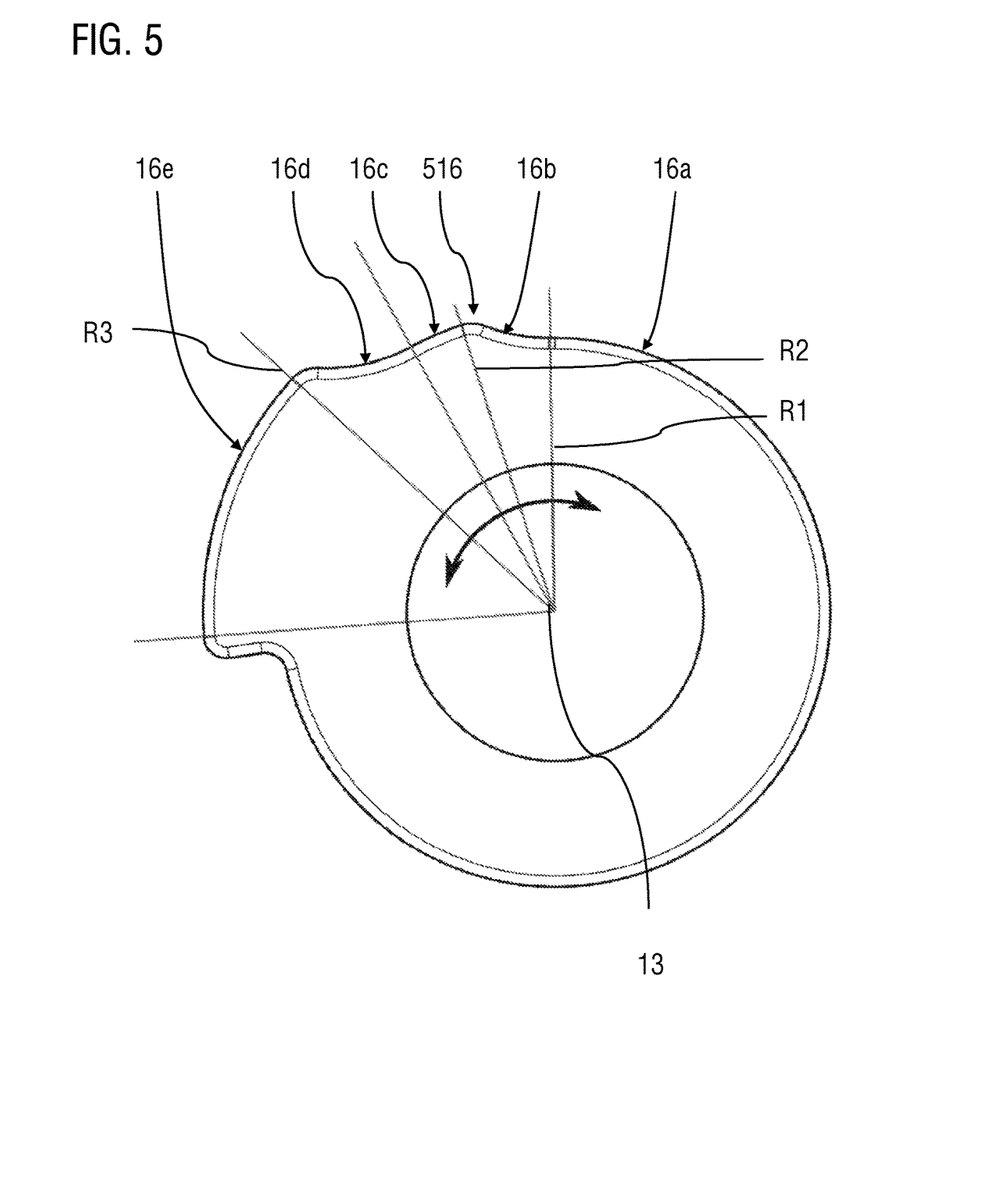
FIG. 5 shows a side view of an internal gear (toothing not shown) with the contour surface according to a further embodiment of the present disclosure.

FIG. 5 shows a side view of the internal gear 15 with the contour surface 516 of the transmission rocker lever 10 according to a further embodiment of the present disclosure. In this embodiment, the contour surface 516 has five different rolling regions 16a-16e. The first rolling region 16a again forms the base circle contour with constant radial spacing R1 to the axis of the axle 13. The adjoining second rolling region 16b in turn forms a ramp contour with an increasing radial spacing, which radial spacing has increased to the value R2 at the end of the second rolling region. The adjoining third rolling region 16c then in turn forms a region with a constant radial spacing R2.

Said third rolling region 16c is then adjoined, in the rolling direction, by a fourth rolling region 16d, which in turn forms a ramp contour. At the end of the fourth rolling region 16d, the radial spacing has increased to the value R3. The fourth region is then adjoined by a fifth rolling region 16e, which in turn has a constant radial spacing. The rolling points on the fifth rolling region 16e have a constant radial spacing to the axis of the rocker lever axle of the transmission lever. The radial spacing R3 of the fifth rolling region 16e is greater than the radial spacing R2 of the third rolling region 16c and greater than the radial spacing R1 of the first rolling region 16a. In this design variant with five rolling regions, the third region 16c forms a middle position, in which the lifting valve is briefly, that is to say when the roller 26 rolls on the third region 16c, held open in an open position with a constant lift height which is smaller than the maximum lift height.

Figure 6:
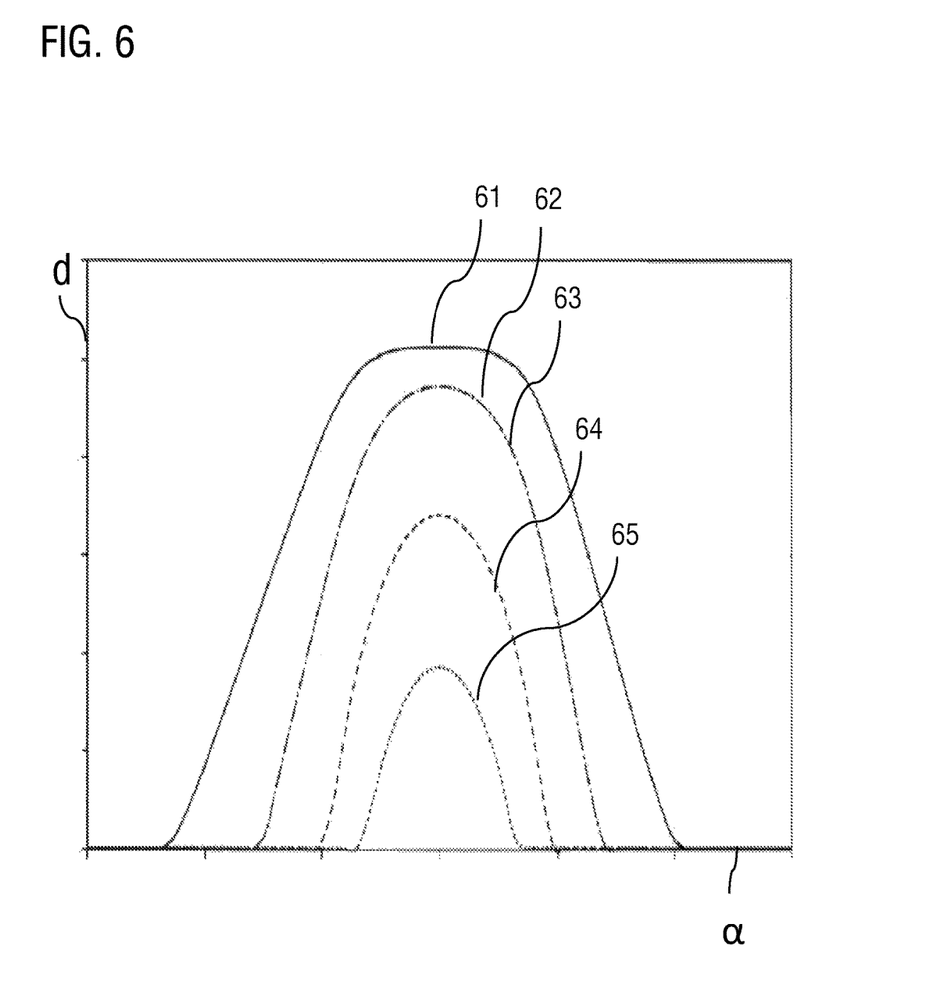
FIG. 6 shows an illustration of various settable lift curves of the lifting valve.

FIG. 6 illustrates different lift curves that can be set by way of the valve drive. The angle of rotation α of the camshaft 3 is plotted on the abscissa. The valve lift d is plotted on the ordinate. The curves 61 to 64 show four different settable valve lift profiles as a function of the angle of rotation of the camshaft. Each of the four curves 61 to 64 corresponds to a particular rotational position, set by way of the actuating device, of the internal gear 15 relative to the planet carrier element 14 of the transmission rocker lever 10. Here, the curve 61 corresponds to a set rotational position which generates the largest valve lift and the shortest valve closing times, whereas, by contrast, the curve 65 generates the smallest valve lift and the longest valve closing times. In the variant 61, therefore, a roof-shaped lift curve can be realized by virtue of the valves being briefly held open at a constant valve lift. Through symmetrical reduction in size or enlargement of the lift curve, it is thus likewise possible for the opening and closing times of the valves to be varied.

Even though the present disclosure has been described with reference to particular exemplary embodiments, it is self-evident to a person skilled in the art that numerous changes may be made, and equivalents used as substitutes, without departing from the scope of the present disclosure. Furthermore, numerous modifications may be made without departing from the associated scope. Consequently, the present disclosure is not intended to be restricted to the exemplary embodiments disclosed, but rather is intended to encompass all exemplary embodiments which fall within the scope of the appended patent claims. In particular, the present disclosure also claims protection for the subject matter and the features of the subclaims independently of the claims to which reference is made.

LIST OF REFERENCE DESIGNATIONS

1 Variable valve drive
2 Cam
3 Camshaft
3a Camshaft axis
10 Transmission rocker lever
11 First end
12 Second end
13 Rocker lever axle of the transmission rocker lever
14 Planet carrier element
14a Receiving element
14b Support element
14c Cover
14d Countersunk screw
14e Pin
15 Internal gear
15a Internal teeth
16, 516 Contour surface
16a, 16b, 16c, 16d, 16e Rolling regions
17 Planet gear
18 Roller
19 Planetary gearing
20 Valve rocker lever
21 First end or valve-side lever arm
22 Second end or camshaft-side lever arm
23 Rocker lever axle of the valve rocker lever
24 Receptacle
25 Hydraulic valve-clearance compensating element
26 Roller
27 Ring-shaped web
30 Sun gear shaft
31a Restoring spring
61-65 Valve lift profile curve
100 Arrangement
R1, R2, R3 Radial spacing

I claim:

1. A variable valve drive for a lifting valve periodically movable between a closed position and an open position indirectly by way of a cam of a camshaft, the variable valve drive comprising:

a switchable rocker lever arrangement for actuation of the lifting valve, the switchable rocker lever arrangement having a transmission rocker lever and a valve rocker lever which are mounted so as to be pivotable on different rocker lever axles which are each parallel to a camshaft axis, wherein the valve rocker lever, at a first end, is in operative contact with the lifting valve and, at a second end, has a roller, wherein the transmission rocker lever, at a first end, is in engagement with the cam of the camshaft and, at a second end, is operatively connected, by way of a contour surface, to the roller of the valve rocker lever, in such a way that a rocking movement of the transmission rocker lever generates a rocking movement of the valve rocker lever, during which the roller of the valve rocker lever rolls on the contour surface; and an actuating device for switching of the rocker lever arrangement, by way of the actuating device the contour surface is rotatable about the rocker lever axle of the transmission rocker lever by means of a planetary gearing, in order to generate a displacement of a rolling region of the roller of the valve rocker lever on the contour surface;

the transmission rocker lever further including at least one planet gear of the planetary gearing, the at least one planet gear is guided by a planet carrier element of the transmission rocker lever, wherein the planet carrier element has the first end of the transmission rocker lever which engages with the cam of the camshaft, and an internal gear of the planetary gearing, the internal gear has the contour surface on an outer circumference and engages into the at least one planet gear; and further comprising a sun gear of the planetary gearing connected rotationally conjointly to a shaft which is rotatable by the actuating device.

2. The variable valve drive according to claim 1, wherein the actuating device comprises an electrical, electromechanical, mechanical or hydraulic actuating unit, by means of which, for adjustment of valve lift, a rotational position of the shaft connected to the sun gear is adjustable.

3. The variable valve drive according to claim 1, wherein the contour surface has a first rolling region which forms a base circle contour which generates no valve lift when the roller of the valve rocker lever rolls on the base circle contour, and has a second rolling region which adjoins the first rolling region and which has a ramp contour.

4. The variable valve drive according to claim 3, wherein the contour surface has a third rolling region which adjoins the second rolling region and which generates a valve position with a greater valve lift when the roller of the valve rocker lever rolls on the third rolling region as compared to the first and second rolling region.

5. The variable valve drive according to claim 4, wherein the contour surface has a fourth rolling region, which adjoins the third rolling region and which forms a ramp contour, and a fifth rolling region, which adjoins the fourth rolling region, wherein the fifth rolling region has a constant radial spacing to an axis of the rocker lever axle of the transmission rocker lever, the radial spacing is greater than a radial spacing of the third rolling region and greater than a radial spacing of the first rolling region.

6. The variable valve drive according to claim 1, wherein the actuating device is configured to vary a rotational position of the shaft connected to the sun gear in a continuously variable fashion.

7. The variable valve drive according to claim 1, wherein the actuating device is configured to vary a rotational position of the shaft connected to the sun gear into two predetermined positions, so as to enable switching between two different valve lifts.

8. The variable valve drive according to claim 1, wherein the transmission rocker lever is preloaded by way of a restoring spring such that the transmission rocker lever is pushed against the camshaft.

9. The variable valve drive according to claim 1, wherein the lifting valve is a charge-exchange valve of an internal combustion engine.

10. An arrangement comprising:

at least two variable valve drives, each variable valve drive including, a switchable rocker lever arrangement for actuation of a lifting valve, the switchable rocker lever arrangement having a transmission rocker lever and a valve rocker lever which are mounted so as to be pivotable on different rocker lever axles which are each parallel to a camshaft axis, wherein the valve rocker lever, at a first end, is in operative contact with the lifting valve and, at a second end, has a roller, wherein the transmission rocker lever, at a first end, is in engagement with a cam of a camshaft and, at a second end, is operatively connected, by way of a contour surface, to the roller of the valve rocker lever, in such a way that a rocking movement of the transmission rocker lever generates a rocking movement of the valve rocker lever, during which the roller of the valve rocker lever rolls on the contour surface; and wherein each of the transmission rocker levers has a common first rocker lever axis, each of the valve rocker levers has a common second rocker lever axis, and the at least two variable valve drives have a common actuating device in the form of an electric motor for switching of the rocker lever arrangement, by way of the common actuating device the contour surface is rotatable about the rocker lever axles of the transmission rocker levers by means of a planetary gearing, in order to generate a displacement of a rolling region of the rollers of the valve rocker levers on the contour surfaces, wherein the electric motor is operatively connected to a shaft which is coaxial with respect to the first rocker lever axis the transmission rocker lever further including at least one planet gear of the planetary gearing, the at least one planet gear is guided by a planet carrier element of the transmission rocker lever, wherein the planet carrier element has the first end of the transmission rocker lever which engages with the cam of the camshaft, and an internal gear of the planetary gearing, the internal gear has the contour surface on an outer circumference and engages into the at least one planet gear; and further comprising a sun gear of the planetary gearing connected rotationally conjointly to a shaft which is rotatable by the actuating device.

11. A motor vehicle, comprising:

an internal combustion engine including a variable valve drive, the variable valve drive having, a switchable rocker lever arrangement for actuation of a lifting valve, the switchable rocker lever arrangement having a transmission rocker lever and a valve rocker lever which are mounted so as to be pivotable on different rocker lever axles which are each parallel to a camshaft axis, wherein the valve rocker lever, at a first end, is in operative contact with the lifting valve and, at a second end, has a roller, wherein the transmission rocker lever, at a first end, is in engagement with a cam of a camshaft and, at a second end, is operatively connected, by way of a contour surface, to the roller of the valve rocker lever, in such a way that a rocking movement of the transmission rocker lever generates a rocking movement of the valve rocker lever, during which the roller of the valve rocker lever rolls on the contour surface; and an actuating device for switching of the rocker lever arrangement, by way of the actuating device the contour surface is rotatable about the rocker lever axle of the transmission rocker lever by means of a planetary gearing, in order to generate a displacement of a rolling region of the roller of the valve rocker lever on the contour surface;

the transmission rocker lever further including at least one planet gear of the planetary gearing, the at least one planet gear is guided by a planet carrier element of the transmission rocker lever, wherein the planet carrier element has the first end of the transmission rocker lever which engages with the cam of the camshaft, and an internal gear of the planetary gearing, the internal gear has the contour surface on an outer circumference and engages into the at least one planet gear; and further comprising a sun gear of the planetary gearing connected rotationally conjointly to a shaft which is rotatable by the actuating device.

12. The motor vehicle of claim 11, wherein the motor vehicle is a utility vehicle.

\* \* \* \* \*